(12) United States Patent
Enomoto

(10) Patent No.: US 6,807,316 B2
(45) Date of Patent: Oct. 19, 2004

(54) IMAGE PROCESSING METHOD AND IMAGE PROCESSING APPARATUS

(75) Inventor: Jun Enomoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 594 days.

(21) Appl. No.: 09/835,554

(22) Filed: Apr. 17, 2001

(65) Prior Publication Data

US 2002/0006230 A1 Jan. 17, 2002

(30) Foreign Application Priority Data

Apr. 17, 2000 (JP) ........................................ 2000-115251

(51) Int. Cl.⁷ ............................. G06K 9/40; G06K 9/36
(52) U.S. Cl. ..................................... 382/264; 382/232
(58) Field of Search ................................ 382/232, 260, 382/261, 264, 284, 274; 348/222.1; 358/1.9, 540

(56) References Cited

U.S. PATENT DOCUMENTS

| | | | |
|---|---|---|---|
| 6,256,424 B1 * | 7/2001 | Murakami | 382/260 |
| 6,480,300 B1 * | 11/2002 | Aoyama | 358/1.9 |
| 6,603,886 B1 * | 8/2003 | Matama | 382/274 |
| 6,674,544 B2 * | 1/2004 | Shiota et al. | 358/1.9 |
| 6,678,420 B1 * | 1/2004 | Takeo et al. | 382/240 |

FOREIGN PATENT DOCUMENTS

| | | |
|---|---|---|
| JP | 03222577 | 10/1991 |
| JP | 09018704 | 1/1997 |
| JP | 09182093 | 7/1997 |
| JP | 1013679 | 1/1998 |

* cited by examiner

*Primary Examiner*—Kanji Patel
(74) *Attorney, Agent, or Firm*—Birch, Stewart, Kolasch & Birch, LLP

(57) ABSTRACT

An image processing method and apparatus arranged to output an image signal for reproducing an image of favorable quality without any considerable reduction in contrast and sharpness even from a high-contrast wide-dynamic-range image by performing dynamic range compression processing, which is as effective as the conventional dodging. Also, the method and apparatus are effective in reducing appearance of a pseudo edge band, which is caused when dynamic range compression is performed at a high compression ratio. A plurality of unsharp image signals representing unsharp images of an original image are generated from an image signal representing the original image. One synthesized unsharp image signal is generated from the plurality of unsharp image signals. The dynamic range compression processing is performed on the image signal of the original image on the basis of the synthesized unsharp image signal.

16 Claims, 9 Drawing Sheets

FIG.3

| | | | |
|---|---|---|---|
| D | −◁ | | ▷+ |
| C | −◁ | | ▷+ |
| M | −◁ | | ▷+ |
| Y | −◁ | | ▷+ |
| γ | −◁ | | ▷+ |
| α light | −◁ | | ▷+ |
| α dark | −◁ | | ▷+ |
| NUMBER OF FILTERS | −◁ | 2 | ▷+ |
| LPF1 | −◁ | $\beta_1$ | ▷+ |
| LPF2 | −◁ | $\beta_2$ | ▷+ |
| SYNTHESIS RATIO COEFFICIENT | −◁ | t | ▷+ |

56 ADJUSTMENT KEYS

IMAGE PROCESSING METHOD AND IMAGE PROCESSING APPARATUS

BACKGROUND OF THE INVENTION

1. Field of the Invention

The present invention relates to an image processing method and apparatus for reproducing a visible image from an image signal obtained by photoelectrically reading an image recorded in a reflective original such as a photographic print or any of other printed matters, or a transparent original such as a film, or from an image signal obtained by photographing an original image with a digital camera or the like using an image pickup device such as a charge-coupled device (CCD).

2. Description of the Related Art

Presently, the dominating method of printing on a photosensitive material (photographic paper) an image photographed on a photographic film such as a negative film or a reversal film (hereinafter referred to simply as a film) is a direct exposure (analog exposure) method in which an image formed on a film is projected onto a photosensitive material to perform surface exposure on the photosensitive material.

On the other hand, digital photoprinters have recently been put to practical use as a printing apparatus using digital exposure. That is, in the digital photoprinters, an image formed on a film is photoelectrically read and converted into a digital signal, which is processed by various kinds of image processing to generate a recording image signal, and an image (latent image) is formed on a photosensitive material by exposing the photosensitive material to a scanning beam of recording light which is modulated with the image signal, thereby obtaining a printed image (finished image).

The digital photoprinter is capable of determining exposure conditions at the time of printing by processing a digital image signal generated from an image. Therefore, it can suitably perform correction of an excessive light or dark condition of an image resulting from a flash photography condition or a strongly backlighted condition, sharpness (sharpening) processing, correction of a color failure and a density failure, correction of a result of underexposure or overexposure, correction of a reduction in peripheral light quantity, etc., to obtain a print at high quality level not attainable by the conventional direct exposure. The digital photoprinter can also perform synthesis of a plurality of images, division of an image, and synthesis of letters by image signal processing, and can output prints controllably edited and processed according to uses.

Moreover, the digital photoprinter can not only output an image in the form of a print (photograph) but also supply an image signal to a computer or the like or store the image signal on a recording medium such as a floppy disk to use the image signal in various uses as well as in photographic uses.

Basically, the above-described digital photoprinter is constituted by a scanner (image reader) which photoelectrically reads an image recorded on a film, an image processor which processes the read image to generate a recording image signal (exposure conditions), and a printer (image recorder) which forms a print by performing scanning exposure of a photosensitive material according to the image signal and by performing development on the photosensitive material.

In the scanner, light emitted from a light source is made incident on a film to be formed into, projected light carrying the image recorded on the film, and the projected light is imaged on an image sensor such as a CCD sensor and is photoelectrically converted into an electrical signal, thereby reading the image. The electrical signal undergoes various kinds of image processing according to one's need to be obtained as a film image signal, which is supplied to the image processor.

The image processor sets image processing conditions from the image signal read by the scanner, processes the image signal under the set conditions to generate an output image signal (exposure conditions) for image recording, and sends the signal to the printer.

If the printer is, for example, a unit for performing light beam scanning exposure, it performs two-dimensional scanning exposure (printing) of a photosensitive material with a light beam by modulating the light beam according to the image signal sent from the image processor, thereby forming a latent image. The printer then performs a predetermined development process, etc., to output a print (photograph) in which the image recorded on the film is reproduced.

Ordinarily, the photographic conditions of images photographed on films vary and there are many cases where the difference between the maximum and minimum levels of light (density) is considerably large in photography using flashlight or in the presence of backlight, in other words, the dynamic range of an image is extremely wide.

If an image photographed on a film under such a condition is printed by performing an ordinary exposure process, there is a possibility of a light (highlighted) or dark (shadow) image portion becoming so light or dark that details thereof are lost. For example, in a case where a human figure in a backlighted state is photographed, a light portion, e.g., an image of a sky is so light that details thereof are lost if exposure is controlled so as to optimize the image of the human figure, or the image of the human figure is so dark that details thereof are lost if exposure is controlled so as to optimize the image of the sky.

For this reason, so-called dodging is performed when exposure of a photosensitive material is performed for printing of an original image which is a film image having a large variation from a highlighted portion to a shadow portion (a wide dynamic range).

Dodging is a technique for correcting the large variation from highlight to shadow in an image photographed on a film to obtain a print in which the image is suitably reproduced throughout the entire image area so that the image is closer to a viewer's impression of the original image. Correction of the variation from highlight to shadow is performed such that ordinary exposure is performed on a portion having an intermediate density, the amount of exposure of a light portion from which an excessively light image with loss of detail can result easily is increased, and the amount of exposure of a dark portion from which an excessively dark image with loss of detail can result easily is reduced. That is, dodging is a technique for compressing the dynamic range of an original image.

Various ideas of processing corresponding to the conventional dodging have been proposed with respect to the above-described digital photoprinter that reproduces an image on the basis of a digital image signal. Examples of such ideas are image processing methods and apparatuses disclosed in Japanese Patent Application Laid-open Nos. 09-18704, 09-182093, and 10-13679.

Japanese Patent Application Laid-open No. 09-18704 discloses a method of reducing the dynamic range of an original image such that an image signal representing the original image and a signal representing an unsharp image obtained from the original image (unsharp image signal) are processed to obtain a signal representing the difference therebetween, and this difference signal is processed by predetermined image processing to obtain a processed image signal, which is reproduced as a visible image.

Japanese Patent Application Laid-open No. 09-182093 discloses a method in which the unsharp image described in Japanese Patent Application Laid-open No. 09-18704 is formed by filtering through an infinite impulse response (IIR) filter. Japanese Patent Application Laid-open No. 10-13679 discloses a method in which a plurality of low-pass filters are provided, one of the plurality of low-pass filters having the mask size determined according to the pixel density of the reproduced image is selected to form an unsharp image of a varying mask size, and an unsharp image is formed by using the selected low-pass filter.

Each of these processing methods comprises a process in which a setting of the ratio of compression of the dynamic range of the whole of an image, a setting of compression of the dynamic range according to a degree of importance of a light or dark image portion, etc., are made in a setup section, and according to these settings, signal processing is performed as shown in FIG. 9A. That is, a low-frequency component of an image signal $S_0'$, i.e., an unsharp image signal $S_1'$ which changes moderately, is prepared by filtering using a low-pass filter, and the value of the unsharp image signal $S_1'$ is inverted by conversion of the unsharp image signal $S_1'$ based on a look-up table (LUT computation), thereby generating a processed image signal $S_4'$ having a compressed dynamic range. This processed image signal $S_4'$ is added to the image signal $S_0'$ of the original image to obtain an image signal $S_5'$. Thus, the dynamic range of an image signal of a low-frequency component having a frequency lower than the set low-pass filter cutoff frequency, i.e., a moderately-changing image signal, is compressed while an image signal of a high-frequency component having a frequency higher than the low-pass filter cutoff frequency, i.e., a busy image signal of large density variation in the image space, is maintained without being changed, thus enabling compression of the dynamic range of the original image as effectively as the conventional dodging and enabling an image to be suitably reproduced throughout the entire image area so that the image is closer to a viewer's impression of the original image even if the original image is a backlighted scene, a high-contrast scene, or the like.

The above-described processing methods, however, entail a drawback in that, since a low-frequency component of an image signal is compressed by using a low-pass filter, if the ratio of dynamic range compression is high, a pseudo edge band of a certain width is generated along an edge of a subject at a boundary between the subject and the background at which the image signal changes abruptly, resulting in failure to faithfully reproduce the original image. To avoid generation of such a pseudo edge band, the degree of unsharpness of the unsharp image may be reduced (by increasing the cutoff frequency of the filter) to such a level that the pseudo edge band generated as described above is not visually recognizable. In this manner, the ratio of dynamic range compression can be reduced to limit an appearance of the above-described pseudo edge band. However, this method of reducing the ratio of dynamic range compression by reducing the degree of unsharpness of the unsharp image has an adverse effect. That is, when the processed image signal generated on the basis of the unsharp image is added to the image signal of the original image, a comparatively flat region, which has a relatively low contrast in comparison with a boundary region between the subject and the background in the original image at which the image signal changes abruptly by a large amount (having a large dynamic range) and has a relatively small change in density in the image space, may be further reduced in contrast to form an indistinct and unsharp flat region.

SUMMARY OF THE INVENTION

In view of the above-described circumstances, an object of the present invention is to provide an image processing method and apparatus which process an image by dynamic range compression processing to achieve the same effect as the conventional dodging without losing the desired sharpness of the image even if the processed image is a high-contrast wide-dynamic range image, such as a backlighted image or an image photographed by using flashlight, which thereby output an image signal to reproduce a high-quality image, and which output an image signal capable of reducing the appearance of a pseudo edge band caused when the ratio of dynamic range compression is high.

To achieve the above-described object, according to one aspect of the present invention, an image processing method having the following steps is provided. The step of generating a plurality of unsharp image signals representing unsharp images of an original image from an image signal representing the original image, the step of generating one synthesized unsharp image signal from the plurality of unsharp image signals, and the step of performing dynamic range compression processing on the image signal of the original image on a basis of the synthesized unsharp image signal such as to reduce the dynamic range of the original image.

It is preferable that the plurality of unsharp image signals are generated by filtering processes differing from each other in filtering characteristics and have different degrees of unsharpness.

Then, it is more preferable that the filtering processes are low pass filterings and differ from each other in cutoff frequencies.

And it is still more preferable that the plurality of unsharp image signals has a first signal and a second signal, the first signal being generated by a filtering process having lower cutoff frequency than that of a filtering process for the second signal, and the synthesized unsharp image signal is generated to have a value approaching to a value of the first signal as difference between the first signal and the second signal increases, and to have a value approaching to a value of the second signal as the difference decreases.

It is preferable that the filtering processes are performed by filter coefficients differing from each other and the filter coefficients are changed according to a number of pixels in an image reproduced as a reproduction of the original image.

And, it is also preferable that the filtering processes are performed by filter coefficients differing from each other and the filter coefficients are changed according to at least one of a result of scene identification of the original image and photography information relating to the original image.

In the image processing method, it is also preferable that the synthesized unsharp image signal is generated using a synthesis ratio or ratios of the plurality of unsharp image signals and the synthesis ratio or ratios is or are changed according to a number of pixels in an image reproduced as a reproduction of the original image.

And it is preferable that the synthesized unsharp image signal is generated using a synthesis ratio or ratios of the plurality of unsharp image signals and the synthesis ratio or ratios is or are changed according to at least one of a result of scene identification of the original image and photography information relating to the original image.

It is also preferable that the synthesized unsharp image signal is generated by synthesis from the plurality of unsharp image signals based on computation in accordance with at least one of addition, subtraction, multiplication and division of the plurality of unsharp image signals.

The present invention provides an image processing apparatus which performs dynamic range compression processing on an image signal representing an original image such as to reduce the dynamic range of the original image, the apparatus having a condition setting device for setting a condition of the dynamic range compression processing which has a number of unsharp image signals to be generated from the image signal of the original image, an unsharp image generating device generating a single unsharp image signal or a plurality of unsharp image signals from the image signal of the original image on a basis of the number set in the condition setting means, a synthesizer synthesizing the plurality of unsharp image signals into a synthesized unsharp image signal when the unsharp image generating device generates the plurality of unsharp image signals, and a processor performing the dynamic range compression processing on the image signal of the original image on a basis of the single unsharp image signal or the synthesized unsharp image signal.

In the image processing apparatus, it is preferable that the unsharp image generating device has a low pass filter or filters to be set which is or are variable in number and cutoff frequency or frequencies thereof is or are variable.

Then, it is more preferable that the low pass filters has a first filter for a first signal of the unsharp image signals and a second filter for a second signal of the unsharp image signals, the first filter having lower cutoff frequency than the second filter, and the synthesizer generates a synthesized unsharp image signal to have a value approaching to a value of the first signal as difference between the first signal and the second signal increases and to have a value approaching to a value of the second signal as the difference decreases.

It is also preferable that the cutoff frequency or frequencies is or are changed according to a number of pixels in an image reproduced as a reproduction of the original image.

It is also preferable that at least one of the number of low pass filters and the cutoff frequency or frequencies is or are changed according to at least one of a result of scene identification of the original image and photography information relating to the original image.

In the image processing apparatus, it is preferable that the synthesizer generates the synthesized unsharp image signal using synthesis ratio or ratios which is or are changed according to a number of pixels in an image reproduced as a reproduction of the original image.

It is also preferable that the synthesizer generates the synthesized unsharp image signal using synthesis ratio or ratios which is or are changed according to at least one of a result of scene identification of the original image and photographing information relating to the original image.

BRIEF DESCRIPTION OF THE DRAWINGS

In the accompanying drawings:

FIG. 3 is a diagram schematically showing an example of adjustment keys connected to the image processing apparatus shown in FIG. 1;

FIG. 4A shows a gray balancing LUT;

FIG. 4B shows a brightness correction LUT;

FIG. 4C shows a gradation correction LUT;

DESCRIPTION OF THE PREFERRED EMBODIMENT

An image processor for carrying out the image processing method of the present invention will be described below in detail in accordance with a preferred embodiment with reference to the accompanying drawings.

Figure 1:
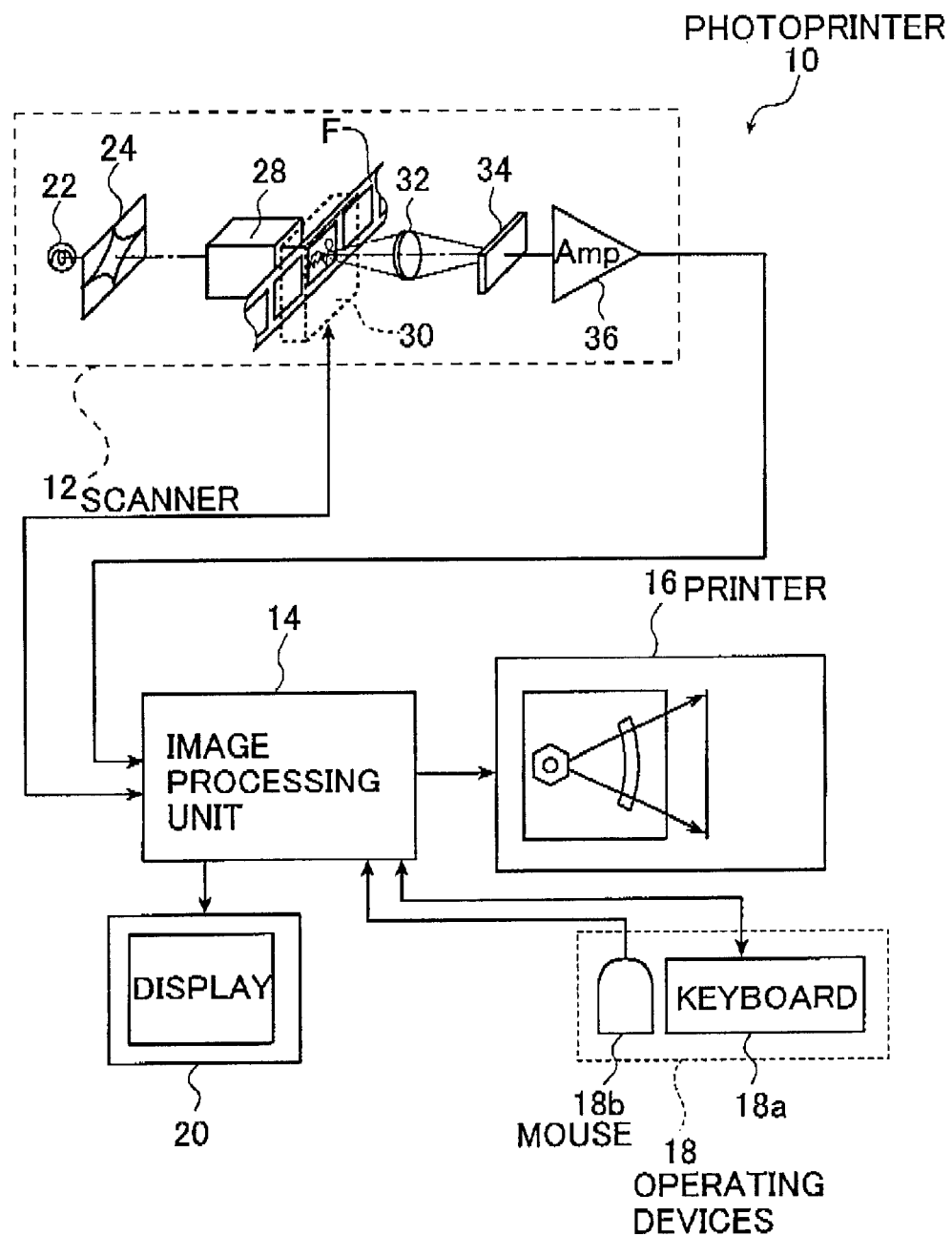
FIG. 1 is a block diagram of a digital photoprinter based on an example of an image processing apparatus of the present invention.

FIG. 1 is a block diagram schematically showing a digital photoprinter 10 utilizing the image processing apparatus of the present invention.

The digital photoprinter 10 shown in FIG. 1 is basically constituted by a scanner (image reader) 12 for photoelectrically reading original images recorded on a film F, an image processing unit 14 for performing image processing of an image signal (image information) read by the scanner 12, and for operating and controlling all components of the photoprinter 10, and a printer 16 which performs image exposure on a photosensitive material with a light beam modulated according to an image signal supplied from the image processing unit 14, performs a development process and outputs a (finished) print.

To the image processing unit 14 are also connected a set of operating devices 18, i.e., a keyboard 18a and a mouse 18b for inputting (setting) various conditions, selecting a kind of processing, inputting instructions relating to processing, inputting instructions relating to color/density correction, etc., and a display 20 for displaying an image read by the scanner 12, and windows for various operation instructions, settings and registrations of various conditions, etc.

The scanner 12 is a unit for photoelectrically reading images photographed on film F or the like. The scanner 12 has a light source 22, a variable diaphragm 24, a diffuser box 28 for diffusing reading light traveling to film F so that the reading surface of the film F is uniformly illuminated with the reading light, an imaging lens unit 32, a CCD sensor 34 formed of a line type CCD image pickup device for reading an image, and an amplifier 36. Further, one of special types of film carriers 30 is detachably attached to the main body of the scanner 12.

The carriers 30 prepared for use with the scanner 12 are specially designed to support long strips of film, e.g., the 135-size 24-exposure film, the film in the Advanced Photo System (APS) cartridge, and films in throwaway cameras. The carrier 30 has a pair of transfer rollers (not shown) for transferring a film F in an auxiliary scanning direction corresponding to the longitudinal direction of the film F and perpendicular to the direction in which the line type CCD image pickup device in the CCD sensor 34 extends (main scanning direction) while supporting the film F at a predetermined reading position. The pair of transfer rollers are disposed on the opposite sides of the reading position in the auxiliary scanning direction. The carrier 30 also has a mask (not shown) with a slit for restricting the path for projection light from the film F to its opening, and a magnetic reading and writing device (not shown) for reading magnetic recording information recorded on a transparent magnetic recording layer on the APS film or writing information to the recording layer.

The CCD sensor 34 is a line type sensor Comprising three line CCD sensors for respectively reading red (R) pixels, green (G) pixels, and blue (B) pixels. These line CCD sensors are arranged in the main scanning direction in the order of R, G, and B. These line CCD sensors photoelectrically read projected light from the film F by decomposing it in three primary colors R, G, and B.

The CCD sensor 34, described above as a line type CCD sensor, may alternatively be an area type COD sensor having, for example, a 1380×920 array of elements for reading pixels. In such a case, three color filters for decomposing an image to three primary colors R, G, and B are provided between the variable diaphragm 24 and the diffuser box 28.

Reading of images with the COD sensor 34 in the scanner 12 is performed two times by prescanning and fine scanning. A prescan for reading the images at a low resolution is performed to determine image processing conditions etc., before image reading (fine scan) for outputting a print P. After adjustment and check of the conditions performed by an operator through the display 20, a fine scan for reading the images at a high resolution is performed.

When a prescan is performed, the light source 22 emits light and the variable diaphragm 24 adjusts the quantity of this light. The diffuser box 28 makes this light uniform on the film F supported at the predetermined reading position and transferred by the carrier 30. The light travels through the film F to be obtained as projected light carrying each of images photographed on the film F.

The film F is scanned with the light traveling through the film F while the light is shaped in accordance with the shape of the slit provided in the carrier 30 to be formed as reading light (projected light). The reading light is focused by the imaging lens unit 32 to form the image on the light receiving surface of the CCD sensor 34, and the image is photoelectrically read by the CCD sensor 34 to generate an output signal, which is amplified by the amplifier 36 and supplied as an input image signal to the image processing unit 14. This process is not separately performed with respect to each of a plurality of picture frames but performed to continuously read the full length of the film F by transferring the film F at a constant speed.

If the film F is an APS film, a magnetic recording layer on which magnetic recording information can be recorded is provided in upper and lower portions of each frame area on the back surface (non-emulsifier surface) of the film F. Various kinds of data can be recorded as magnetic recording information on the magnetic recording layer. Examples of recordable data are cartridge identification (ID) information, information on the kind of film, and information about photography and development, such as the date of photography, information on use/non-use of flashlight for photography, the picture-taking lens power, a photographed scene ID, information on the positions of main portions, and information on the kind of a development device. When a prescan is performed, recorded magnetic recording information is read with the above-mentioned magnetic reading and writing device provided in the carrier 30 and is supplied to the image processing unit 14. Thus, the image processing unit 14 can obtain photography information as mentioned below etc., from the magnetic recording information.

The illustrated photoprinter 10 has, as source for supplying an image signal to the image processing unit 14, the scanner 12 for photoelectrically reading images photographed on a negative film or a reversal film. However, various image signal supply sources for supplying image signals to the image processing unit 14, i.e., various image reading devices, image capturing devices, image signal reading and storing devices, etc., other than the scanner 12 can also be used. Examples of such devices are image pickup devices such as digital still cameras and digital video cameras, image reading devices for reading an image in a reflective original, communication devices used in a network such as a local area network (LAN) and a computer communication network, and reading and storing devices for mediums (recording mediums) such as memory cards and magneto-optical (MO) recording mediums.

As mentioned above, the image signal output from the scanner 12 is supplied to the image processing unit 14 (hereinafter referred to as processor 14).

Figure 2:
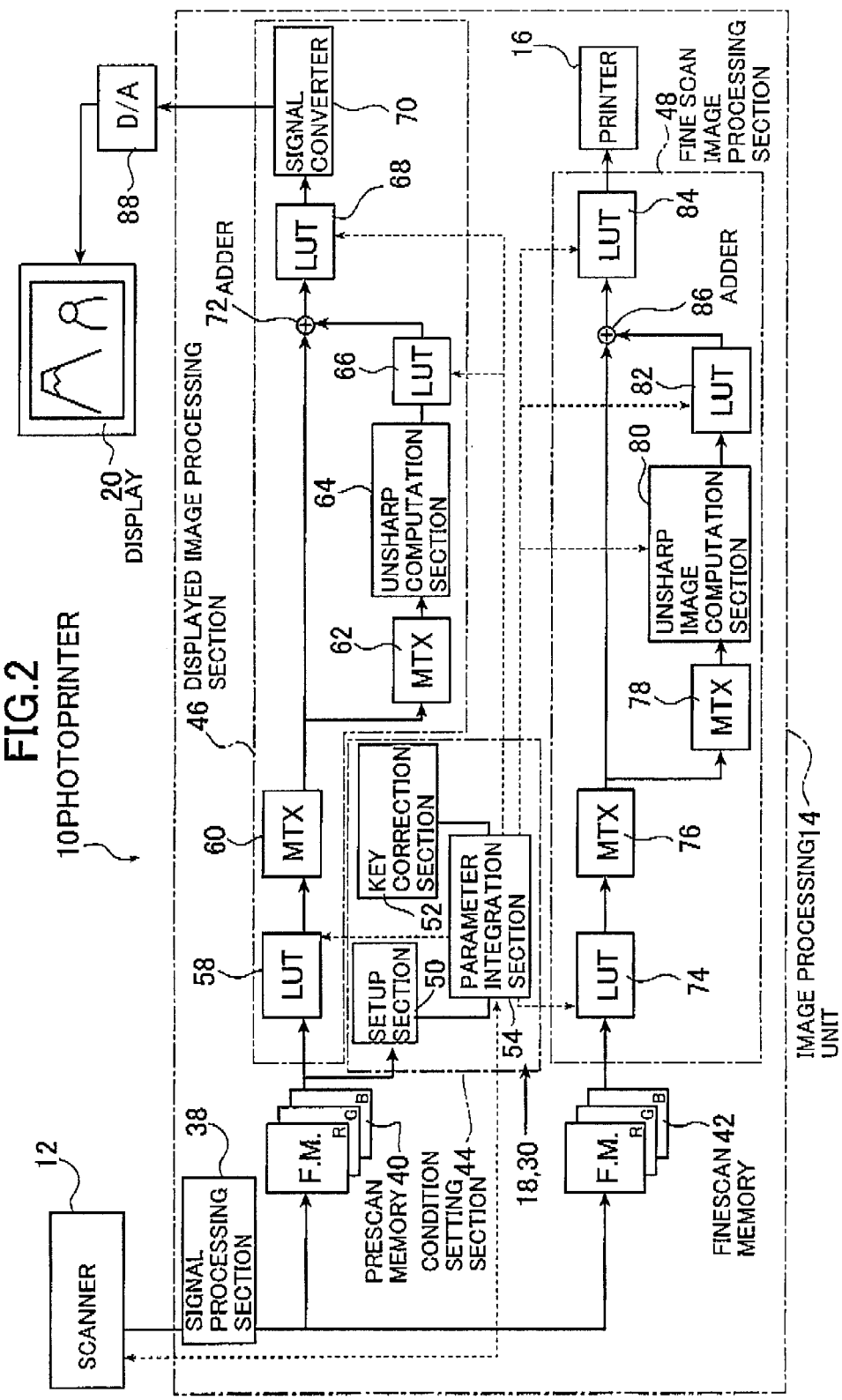
FIG. 2 is a block diagram of the image processing apparatus for the digital photoprinter shown in FIG. 1.

FIG. 2 is a block diagram of the processor 14. The processor 14 represents the image processor in accordance with the present invention. The processor 14 is constituted by a signal processing section 38, a prescan (frame) memory 40, a fine scan (frame) memory 42, a condition setting section 44, a displayed image processing section 46, and a fine scan image processing section 48.

In FIG. 2, sections relating to certain kinds of image processing are mainly illustrated. In the processor 14 are also arranged a central processing unit (CPU) for overall control and management of the entire photoprinter 10 including the processor 14, a memory for storing information necessary for the operation of the photoprinter 10, etc., devices for determining the aperture value of the variable diaphragm 24 and the accumulation time of the CCD sensor 34 in fine scan, etc. The operating devices 18 and the display 20 are connected to the related sections through the CPU etc. (CPU bus).

R, G, and B output signals from the scanner 12 are processed by the signal processing section 38 which performs, for example, analog-to-digital (A/D) conversion, logarithmic transformation, DC offset correction, dark correction, and shading correction. The signal thus processed is output as a digital image signal. A prescan image signal and a fine scan image signal obtained as this digital image signal are stored in the prescan memory 40 and the fine scan memory 42, respectively.

The prescan image signal and the fine scan image signal are basically identical to each other except that they differ in resolution (pixel density) and in signal level.

The prescan image signal stored in the prescan memory 40 is read to the displayed image processing section 46 and to the condition setting section 44, and the fine scan image signal stored in the fine scan memory 42 is read to the fine scan image processing section 48.

The condition setting section 44 includes a setup (processing condition setting) section 50, a key correction section 52, and a parameter integration section 54.

The setup section 50 is a section for setting basic image processing conditions. The setup section 50 forms a density histogram from prescan image signals stored in the prescan memory 40, computes, from these signals, image feature values, such as a highlight level (maximum density), a shadow level (minimum density), an average density, and a large-area transmission density (LATD), and sets image processing conditions. More specifically, the setup section 50 forms a look-up table (LUT) for various kinds of image processing, e.g., gray balancing (color balancing) and image dynamic range compression processing and computes correction coefficients (processing coefficients) etc. In the processor 14 of the present invention, processing conditions of dynamic range compression processing are set according to the above-mentioned image feature values and photography information in magnetic recording information obtained, and may be set by key input operations through the key correction section 52 if necessary.

Image processing conditions set as described above will be described below in more detail.

The key correction section 52 computes correction amounts of image processing conditions according to instructions (inputs) provided by an operator using adjustment keys 56 or the like set in the keyboard 18a as shown in FIG. 3.

For example, the adjustment keys 56 shown in FIG. 3 are operated to set or adjust the ratio of compression of the dynamic range of each of the total density (D), the cyan (C) density, the magenta (M) density, the yellow (Y) density, gradation (Y), a light portion (highlight-side $\alpha_{light}$), and a shadow portion (shadow-side $\alpha_{dark}$) the number of low-pass filters (LPFs) for setting the number of unsharp image signals forming unsharp images used for dynamic range compression as described below, filter coefficients $\beta_1$ and $\beta_2$ of such filters, and, if a plurality of such low-pass filters (LPF) are provided, a synthesis ratio coefficient t for generating one synthesized unsharp image signal from a plurality of unsharp image signals obtained by the plurality of low-pass filters. The operator checks the results of setting and adjustment by observing an image displayed on the display 20, and presses the (+) key and the (−) key for changing the parameters if necessary, thereby adjusting the image to the desired conditions. The image processing conditions are thus adjusted.

The parameter integration section 54 combines image processing conditions set by the setup section 50 and correction amounts computed by the key correction section 52 to obtain finally-set image processing conditions. If no input is provided by operating the adjustment keys 56, image processing conditions of processing of fine scan data (output image) are the same as image processing conditions set by the setup section 50.

After combining and setting image processing conditions, the parameter integration section 54 sets the image processing conditions in predetermined subsections of the displayed image processing section 46 and the fine scan image processing section 48. In these sections, image signals are processed according to the set image processing conditions. When some inputs are supplied from the adjustment keys 56 to change the image processing conditions previously set by the parameter integration section 54, the image on the display 20 is correspondingly changed.

The displayed image processing section 46 reads out prescan image signals stored in the prescan memory 40, and processes the read signals by image processing according to image processing conditions set in the condition setting section 44 to generate image signals for display on the display 20. The displayed image processing section 46 is constituted by a first LUT 58, a first matrix operation device (MTX) 60, a second MTX 62, an unsharp image computation section 64, a second LUT 66, a third LUT 68, a signal converter 70, and an adder 72.

On the other hand, the fine scan image processing section 48 reads out fine scan image signals stored in the fine scan memory 42, and processes the read signals by predetermined image processing according to image processing conditions set in the condition setting section 44 to generate output image signals for image recording in the printer 16. The fine scan image processing section 48 is constituted by a first LUT 74, a first MTX 76, a second MTX 78, an unsharp image computation section 80, a second LUT 82, a third LUT 84, and an adder 86. Further, each of the displayed image processing section 46 and the fine scan image processing section 48 may be provided with a sharpness processing section for performing sharpening processing, an electronic zooming processing section for processing image signals so as to electronically change the magnification and the like.

As is apparent from the foregoing, the two image processing sections have substantially the same configurations, have basically the same settings of processing conditions except for setting of different numbers of pixels (resolutions), and perform the same image processing.

The two image processing sections will be described mainly with respect to the fine scan image processing section 48 representing the other.

The first LUT 74 (the first LUT 58) reads out image signals stored in the fine scan memory 42 (prescan memory 40) and processes the signals for gray balancing, brightness (density) correction and gradation correction. The first LUT 74 comprises cascaded LUTs for these kinds of correction and adjustment. The LUTs in the first LUT 74 are formed and set by the above-described condition setting section 44.

Figure 4A:
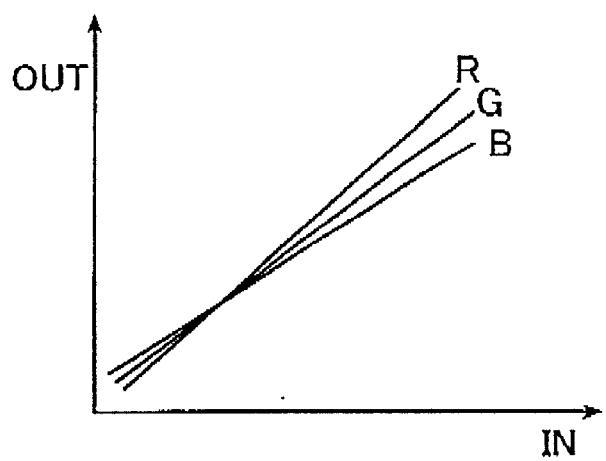
FIGS. 4A, 4B, and 4C are diagrams showing LUTs set in the image processing apparatus shown in FIG. 1.
Figure 4B:
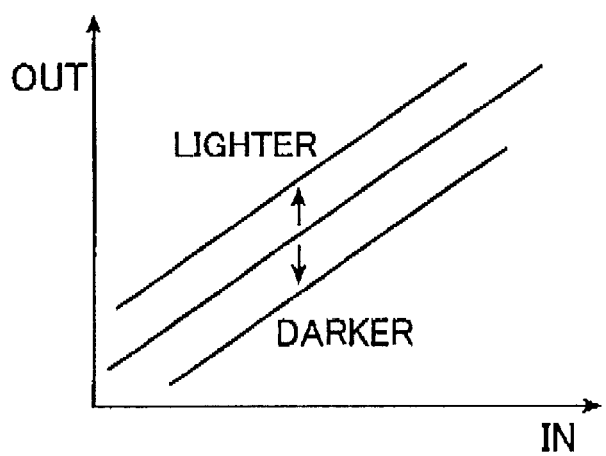
Figure 4C:
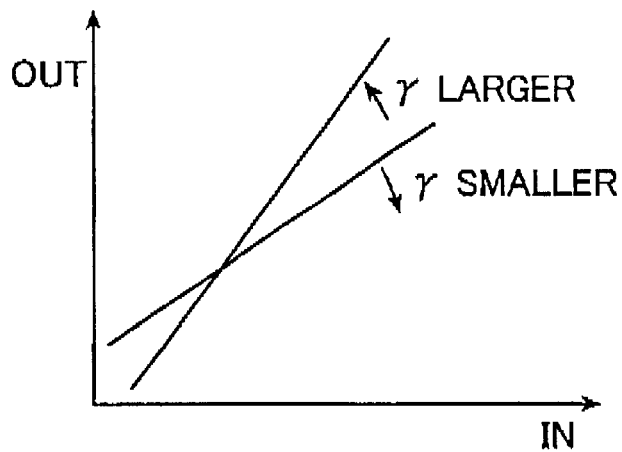

FIGS. 4A, 4B, and 4C show examples of tables set in the first LUT 74.

FIG. 4A shows a gray balancing table. The setup section 50 forms this adjustment table by gray balancing between a highlight and a shadow based on a well-known method. When an input is supplied from the adjustment keys 56 (C,M,Y KEYS), the key correction section 52 computes a correction amount and the parameter integration section 54 combines this correction amount and the adjustment table formed by the setup section 50, thereby changing the inclination of R, G, and B in the adjustment table.

FIG. 4B shows a correction table for correcting brightness. The setup section 50 forms this correction table from a density histogram, a highlight and a shadow by using a well-known setup algorithm. This correction table is adjusted as shown in FIG. 4S according to an input by the density (D) key in the adjustment keys 56, as is the gray balancing table.

FIG. 4C shows a gradation correction table. The setup section 50 forms this correction table from a density histogram, a highlight and a shadow by using a well-known setup algorithm. This correction table is adjusted as shown in FIG. 4C according to an input by the gradation (γ) key in the adjustment keys 56, as is the gray balancing table.

The first MTX 76 (first MTX 60) performs saturation correction of image signals processed by the first LUT 74. To perform saturation correction, the first MTX 76 performs a matrix calculation which is set according to the spectral characteristics of the film F and a photosensitive material (printing paper), the characteristics of a development process, etc.

The image information processed by the first MTX 76 is supplied to the adder 86 (adder 72) and to the second MTX 78 (second MTX 62) to form image signals for dynamic range compression processing.

If dynamic range compression processing is not performed, the first MTX 76 and the third LUT 84 (first MTX 60 and third LUT 68) are connected, and image signals for dynamic range compression processing are not formed. Determination as to whether or not this processing should be performed may be made by mode selection according to an input provided by the operator or by a method of determination from the results of calculations in the condition setting section 44.

The second MTX 78 (second MTX 62) forms a brightness image signal of a read image from R, G, and B image signals supplied from the first MTX 76.

A method for forming this brightness image signal is, for example, a method of using ⅓ of the average value of R, G, and B image signals or a method of converting a color image signal into a brightness image signal in accordance with the YIQ specification.

In an example of a method for obtaining a brightness image signal in accordance with the YIQ specification, only the Y component in accordance with the YIQ specification is computed from R, G, and B image signals by the following equation:

$$Y=0.3R+0.59G+0.11B$$

The unsharp image computation section 80 (unsharp image computation section 64) processes with a low-pass filter (LPF) the brightness image signal formed by the second MTX 78 (second MTX 62) to extract low-frequency components, thereby obtaining an unsharp image signal of the read image by two-dimensionally unsharpening the brightness image.

Figure 5A:
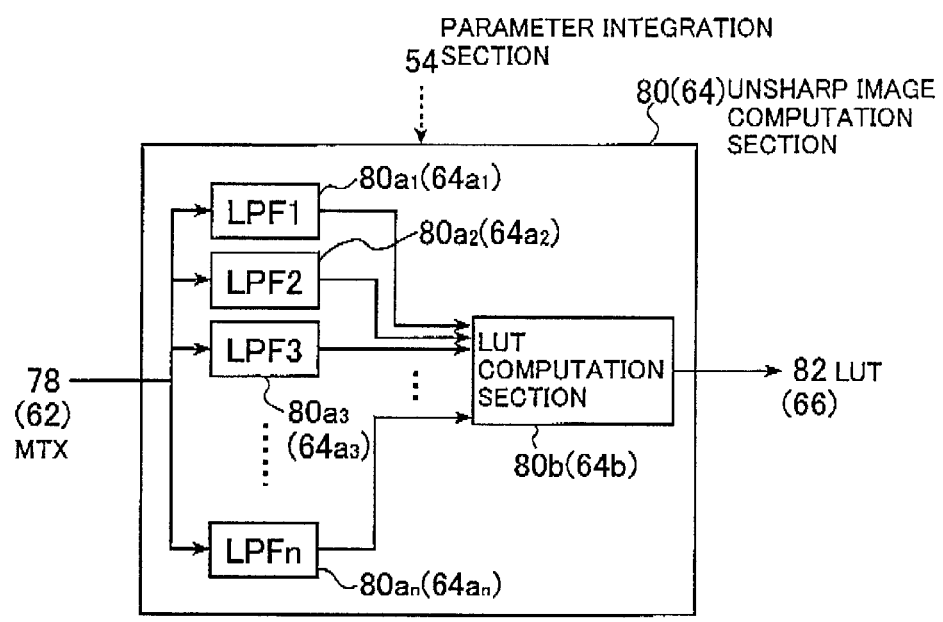
FIGS. 5A and 5B are block diagrams showing the configuration of main components of the unsharp image computation section of the image processing apparatus shown in FIG. 2.

The unsharp image computation section 80 (unsharp image computation section 64) has, as shown in FIG. 5A, low-pass filters (LPF1 to LFPn) $80a_1$ to $80a_n$ (low-pass filters $64a_1$ to $64a_n$), and a LUT computation section 80b (LUT computation section 64b). The unsharp image computation section 80 is arranged to change the number of low-pass filters (LPF1 to LPFn) used for filtering according to the number of low-pass filters set by the above-described key correction section 52. The number of low-pass filters used for filtering in this section is not smaller than 1. That is, only one low-pass filter may be used for filtering or two or more low-pass filters may be used for filtering. In this embodiment, a case of setting a plurality of low-pass filters, corresponding to a feature of the present invention, will be described.

LPF1 to LPFn $80a_1$ to $80a_n$ are forming an unsharp image generating device in accordance with the present invention. Infinite impulse response (IIR) type LPFs are used as LPF1 to LPFn $80a_1$ to $80a_n$ because they enable an unsharp image signal of a high degree of unsharpness to be generated by a small-scale circuit. Finite impulse response (FIR) type LPFs, or median filters (MFs) may alternatively be used. Use of MFs is preferred because an unsharp image signal by cutting noise (high-frequency components) of a flat portion is obtained while preserving an edge. Advantageously, an unsharp image signal forming an image having a high degree of unsharpness can be produced while the above-mentioned advantage of MFs is utilized. For this reason, both MFs and LPFs may be used and images respectively obtained by the two kinds of filters may be added while being suitably weighted. In the present invention, LPF1 to LPFn $80a_1$ to $80a_n$ cannot be limited to circuits. Alternatively, filtering functions of LPF1 to LPFn $80a_1$ to $80a_n$ may be performed on a software, when the image processing unit 14 is configured in a computer.

Figure 5B:
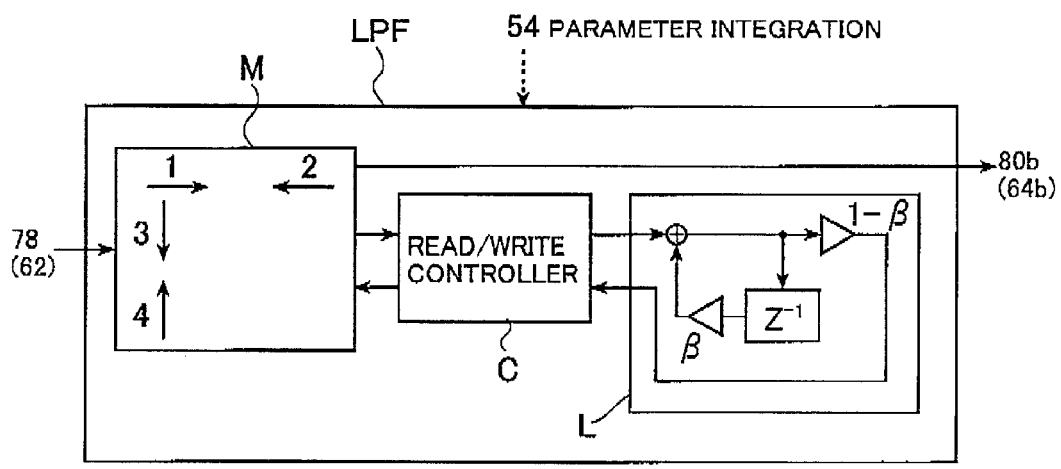

FIG. 5B shows an example of IIR filters used as LPF1 to LPFn $80a_1$ to $80a_n$ ($64a_1$ to $64a_n$). Each LPF has an IIR filter circuit L of a first-order-lag feedback system having a feedback coefficient β, a memory section M for holding and recording an image signal, and a controller C for reading a signal from the memory section M and supplying the signal to the IIR filter circuit L or supplying a signal from the IIR filter circuit L to the memory M.

The feedback coefficient β is an adjustable constant for determining the cutoff frequency of the low-pass filter as an important filter characteristic, and is set as a filter coefficient β. Setting filter coefficient β enables the LPF to function as a low-pass filter which allows only low-frequency components having frequencies lower than the cutoff frequency to pass therethrough, whereby an unsharp image signal is generated. For example, when the filter coefficient β is set to a value close to 1, the cutoff frequency is reduced and an unsharp image signal forming an unsharp image having a high degree of unsharpness is produced. The filter coefficient β is set by the setup section 50 or by using one of the adjustment keys 56 in the key correction section 52, as shown in FIG. 3. In the case of setting through the key correction section 52, each of the filter coefficient $β_1$ in the section for LPF1 in the table of the adjustment keys 56 and the filter coefficient $β_2$ in the section for LPF2 is set. For example, the filter coefficient β of each LPF can be set by pressing the corresponding key at the time of checking by the operator.

In the thus-arranged LPF, an image signal supplied from the second MTX 78 (second MTX 62) is temporarily held by being recorded in the memory section M and is sequentially called up from the memory section M from left to right in each image pixel column by the controller C, as shown in FIG. 5B. The image signal called up is processed by filtering through the IIR filter circuit L, and the processed image signal is supplied to the memory section M to be held and recorded in the same. Thereafter, the image signal is sequentially called up from right to left in each image pixel column by the controller C and is processed by filtering through the IIR filter circuit L, and the processed image signal is supplied to the memory section M to be held and recorded in the same. Further, the image signal is sequentially called up from top to bottom in each image pixel row by the controller C and is processed by filtering through the IIR filter circuit L, and the processed image signal is supplied to the memory section M to be held and recorded in the same. Thereafter, the image signal is sequentially called up from bottom to top in each image pixel row by the controller C and is processed by filtering through the IIR filter circuit L, and the processed image signal is supplied to the memory section M to be held and recorded in the same. The image signal processed in this manner and recorded in the memory section M is called up to be supplied to the LUT computation section 80b (LUT computation section 64b).

Thus, processing of an image signal in the four directions, i.e., the leftward and rightward directions and the upward and downward directions of an image, so that, in the filtering with the IIR filter, phase shifts contained in the image signal can be canceled, Thus, it is possible to obtain an unsharp image signal containing only low-frequency components of an image signal and free from phase shifts.

In the above-described filtering processing, processing in each of the four directions of an image is performed one time. However, processing in one direction may be performed a certain number of times to change the degree of unsharpness of an unsharp image. The number of times the filtering is performed in this manner may be set by operating one adjustment key 56.

In a case where FIR type LPFs or MFs are used, mask sizes of the filters may be set so as to set the degree of unsharpness.

As mentioned above, a prescan image signal and a fine scan image signal differ in resolution. Therefore, if the same filtering is performed with respect to prescan and fine scan image signals, a resulting image displayed on the display 20 and a corresponding image reproduced in a print are different from each other.

Therefore, it is necessary that the LPFs $64a_1$ to $64a_n$ of the unsharp image computation section 64 for processing a prescan image signal and the LPFs $80a_1$ to $80a_n$ of the unsharp image computation section 80 for processing a fine scan image signal have different frequency characteristics according to resolutions. More specifically, the extent of upsharpening of an unsharp image signal used for display on the display 20 is reduced at a rate corresponding to the resolution ratio. If the resolution ratio is m; the cutoff frequency of the LPFs $64a_1$ to $64a_n$ is fc(p); and the cutoff frequency of the LPFs $80a_1$ to $80a_n$ is fc(f), the LPF may be designed so that $$fc(p)=m \cdot fc(f).$$

A plurality of unsharp image signals respectively generated by the LPFs $80a_1$ to $80a_n$ (LPFs $64a_1$ to $64a_n$) on the basis of the filter coefficients β set as filter characteristics of the LPFs $80a_1$ to $80a_n$ (LPFs $64a_1$ to $64a_n$) in the above-described manner are supplied to the LUT computation section 80b (LUT computation section 64b).

The LUT computation section 80b (LUT computation section 64b) is a synthesizer of a plurality of unsharp image signals into one synthesized unsharp image signal, and has a LUT.

Figure 6:
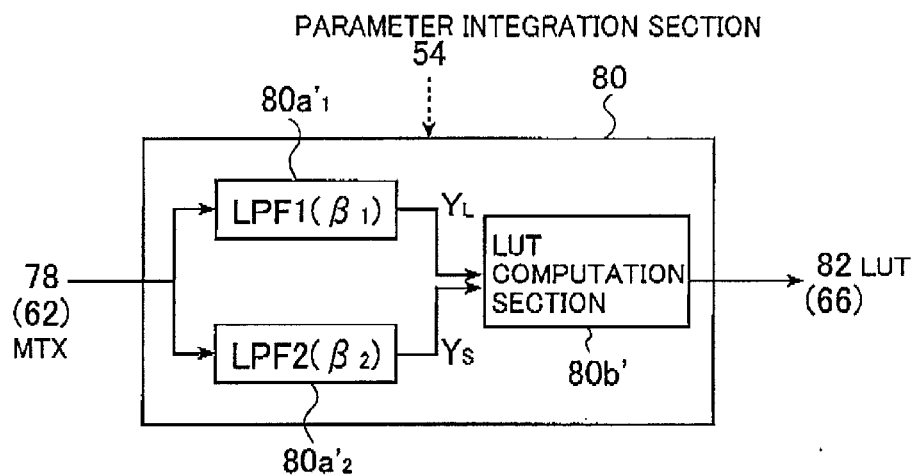
FIG. 6 is a block diagram showing the configuration of another example of the main components of the unsharp image computation section of the image processing apparatus shown in FIG. 2.

A method of synthesizing a plurality of unsharp image signals will be described with respect to a simple case selected for ease of understanding, i.e., a case where, as shown in FIG. 6, the unsharp image computation section 80 has two LPFs $80a_1$ and $80a_2$' and two unsharp image signals are supplied to a LUT computation section 80b'.

In the arrangement shown in FIG. 6, an unsharp image signal $Y_L$ processed by filtering with a filter coefficient $β_1$ in the LPF $80a_1$' and an unsharp image signal $Y_S$ processed by filtering with a filter coefficient $β_2$ in the LPF $80a_2$' are input to the LUT computation section 80b'. The filter coefficient $β_1$ is closer to 1 in comparison with the filter coefficient $β_2$, and the unsharp image signal YL forms an unsharp image having a degree of unsharpness higher than that of an unsharp image corresponding to an unsharp image formed by the unsharp image signal $Y_S$.

The LUT computation section 80b' obtains values from a signal representing the difference between the unsharp image signal $Y_L$ and the unsharp image signal $Y_S$ on the basis of its LUT comprising a table having adjustable characteristics, and generates a synthesized unsharp image signal $Y_{SL}$ by using the values obtained.

The unsharp image synthesis table in the LUT of the LUT computation section 80b' is formed so as to have characteristics described below. An unsharp image signal is synthesized by computation of the unsharp image signal $Y_L$ and the unsharp image signal $Y_S$ in accordance with the addition, subtraction, multiplication, or division. That is, synthesis of an unsharp image signal is performed by computation of unsharp image signals by the four basic operations of arithmetic.

Synthesis is performed such that the value of the synthesized unsharp image signal $Y_{SL}$ is close to the value of the unsharp image signal $Y_S$ when the signal representing the difference between the unsharp image signal $Y_L$ and the unsharp image signal $Y_S$ is small, that is, with respect to an image region of the original image when the image signal representing the original image has a comparatively large amount of Components having frequency higher than the cutoff frequencies of filtering with the LPFs $80a_1$ and $80a_2$, in other words, a region containing edge components of a high-contrast subject.

On the other hand, synthesis is performed such that the value of the synthesized unsharp image signal $Y_{SL}$ is close to the value of the unsharp image signal $Y_L$ when the signal representing the difference between the unsharp image signal $Y_L$ and the unsharp image signal $Y_S$ is large, that is, with respect to an image region of the original image where the image signal representing the original image has a comparatively large amount of components having frequency between the cutoff frequency of filtering with the LPF $80a_1$ and the cutoff frequency of filtering with the LPF $80a_2$, in other words, a flat region where the contrast is comparatively low, and from which only comparatively small variation in image signal appears.

Thus, the unsharp image synthesis table in the LUT generates the synthesized unsharp image signal $Y_{SL}$ by smoothly changing the synthesis ratio of the unsharp image signal $Y_L$ and the unsharp image signal $Y_S$ according to the signal representing the difference between the unsharp image signal $Y_L$ and the unsharp image signal $Y_S$. That is, the unsharp image synthesis table determines the synthesis ratio of the two unsharp image signals. A synthesis ratio coefficient t is used to uniquely determine the synthesis ratio. For example, the synthesis ratio coefficient t is set as a parameter of a function which determines the synthesis ratio according to the signal representing the difference between the unsharp image signal $Y_L$ and the unsharp image signal $Y_S$. This synthesis ratio coefficient t is set in advance as a default value, set by the setup section 50, or set through the key correction section 52 if necessary by using the adjustment key 56 as shown in FIG. 3. For example, the operator may manually set the synthesis ratio coefficient t by pressing the key after checking a synthesis result to supply it to the LUT computation section 80b' via the parameter integration section 54.

As described above, the unsharp image synthesis table held in the LUT in this embodiment is formed with synthesis ratio coefficient t set as a parameter. According to the present invention, however, any other method of setting the synthesis ratio of two image signals may be used as long as the unsharp image synthesis is uniquely performed.

The example of the synthesis method in which two LPFs are set and two unsharp image signals are supplied to the LUT computation section 80*b*' has been described. If three or more LPFs are set and three or more unsharp image signals are generated, the arrangement may be such that a plurality of LUT computation sections like the LUT computation section 80*b*', which generates one unsharp image signal from two unsharp image signals supplied from the predetermined LPFs, are cascaded to synthesize three or more image signals into one. Also, a computation device for synthesizing three or more unsharp image signals into one at a time without using a cascaded circuit may be used instead of the LUT computation section 80*b* (64*b*) described above. Additionally, the synthesis may be performed on a software, The unsharp image computation section 80 (unsharp image computation section 64) is capable of generating a synthesized unsharp image signal by manual setting of filter coefficients β and synthesis ratio coefficient t of the LPFs 80$a_1$ to 80$a_n$ through the key correction section 52, as described above. However, it is preferable to automatically set filter coefficients β and synthesis ratio coefficient t according to the resolution and the pixel density of the image signal and the print size and the electronic zooming ratio of a resulting output from the printer 16. In particular, it is preferable to change filter coefficients β in filtering and synthesis ratio coefficient t of unsharp image signals according to the print size of a reproduction of the original image, i.e., the number of pixels of a reproduced image output as a print.

Further, to generate a synthesized unsharp image signal, filter coefficients β and synthesis ratio coefficient t may be automatically set by being linked to the degree of dynamic range compression described below and to a photographed scene and photography information. For example, a synthesized unsharp image signal may be generated by obtaining photography information read as the magnetic recording information from the transparent magnetic recording layer on APS film F at the time of prescanning of the film F, e.g., information on use/non-use of flashlight, information on a photographic scene such as "night scene portrait" or "snow" (which is identified by scene ID), or by identifying a backlighted scene, a highlight scene, or the like from histogram analysis of an image signal, and by calling up and automatically setting filter coefficients β and synthesis ratio coefficient t registered in advance according to the identified scene. A synthesized unsharp image signal generated in the above-described manner by the LUT computation section 80*b* (LUT computation section 64*b*) is supplied to the second LUT 82 (second LUT 66).

The brightness image signal provided to enable the process of generating a plurality of unsharp image signals by a plurality of filtering processes and synthesizing one synthesized unsharp image signal from the plurality of unsharp image signals in the unsharp image computation section 80 (unsharp image computation section 64) is obtained by the second MTX 78 (second MTX 52) using the Y component in accordance with the YIQ specification. However, this method of generating a brightness image signal is not exclusively used. For example, according to the present invention, a method of generating a brightness image signal without using the second MTX 78 (second MTX 52) may be alternatively used. In this method, R, G and B image signals are used instead of the Y component in accordance with the YIQ specification, a plurality of unsharp image signals are generated from the R, G and B image signals by a plurality of filtering processes, and synthesized unsharp image signals are generated from the plurality of unsharp image signals in one-to-one relationship with the R, G and B image signals. The synthesized unsharp image signals corresponding to the R, G and B image signals are processed by the second LUT 82 (second LUT 62) and the processed signals by the second LUT 82 are added to the R, G and B image signals from the main image signal by the adder 86 (adder 72) described below.

The unsharp image computation section 80 (unsharp image computation section 64) is arranged as described above.

The second LUT 82 (second LUT 66) is a LUT comprising a table for compressing the dynamic range of the image signal using the obtained synthesized unsharp image signal. The second LUT 82 (second LUT 66) and the adder 86 (adder 72) constitute a processor for performing dynamic range compression processing with respect to the image signal of the original image.

As described above, the density range of an image photographable on film F is ordinarily wider than the reproduction range in a print. For example, an image having a density range (the difference between the minimum and maximum densities, i.e., the dynamic range) extending far beyond the limits of the reproduction range of a print may be captured as a backlighted scene or a subject photographed by using flashlight.

In such a case, the image cannot be suitably reproduced on a print by using the image signal. That is, for a negative film a film portion having a high density portion falling outside the reproduction range (corresponding to a low read signal intensity), i.e., a light portion of a subject, is so light on the print that details thereof are lost. Conversely, a film portion of the negative film having a low density portion falling outside the reproduction range, i.e., a shadow portion of the subject is so dark on the print that details thereof are lost. Therefore, to obtain an image in which the entire range of the image signal is reproduced, it is necessary to compress the dynamic range of the image signal so that the range of the image signal is adjusted to the reproduction range in the print. That is, it is necessary to process the image signal by adjusting the densities of the light and shadow portions without changing the gray level of an intermediate-density portion in order to compress the dynamic range so as to obtain an effect similar to that of the conventional dodging based on direct exposure.

In the processor 14 shown in FIG. 2, the fine scan image signal processed by the first MTX 76 (first MTX 60) is processed in accordance with the dynamic range compression table in the second LUT 82 (second LUT 66) using the synthesized unsharp image signal, and the processed image signal is added to the unprocessed signal, thereby nonlinearly compressing the dynamic range of the image signal and optimizing the dynamic range of an output image signal, the gradation levels and densities of light and shadow portions. Thus, the processor 14 generates an output image signal for printing a high-quality image which gives a viewer substantially the same impression as a viewer's impression of the original scene (photographed scene).

That is, the dynamic range compression table in the second LUT 82 (second LUT 66) is a table for performing image processing of the above-described synthesized unsharp image signal to obtain a processed image signal for suitably compressing the dynamic range of the image signal.

This dynamic range compression table (hereinafter referred to simply as "compression table") is formed in the condition setting section 44. It is formed on the basis of a prescan image signal by being manually set through the key correction section 52, or by referring to photography information obtained from the transparent magnetic recording layer of film F at the time of reading the prescan image signal.

In the present invention, the processor is thus arranged to output, with improved stability, a high-quality image (image signal) which gives a viewer substantially the same impression as a viewer's impression of the original scene (photographed scene).

This compression table is formed as described below.

First, a total (dynamic range) compression ratio $\alpha$ is computed and a compression function $f(\alpha)$ using this compression ratio is set.

Figure 7:
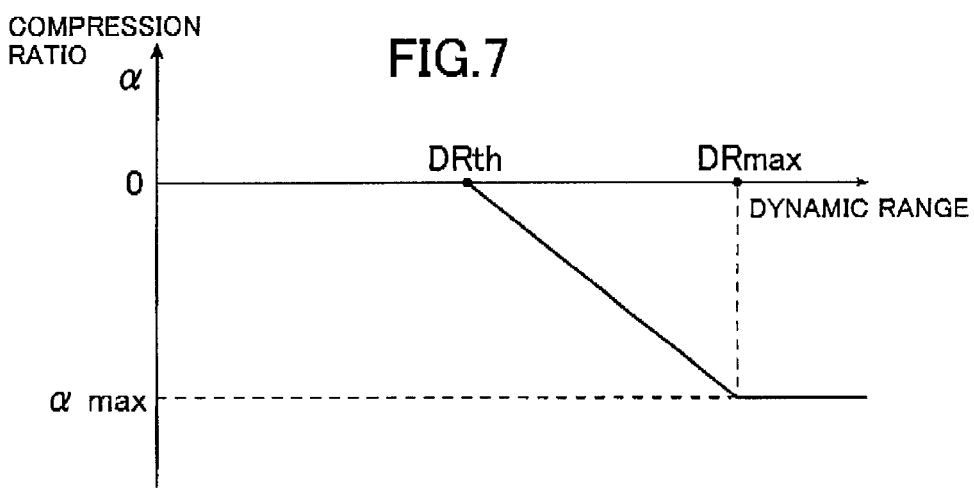
FIG. 7 is a diagram showing a function representing the total compression ratio in dynamic range compression processing in the image processing apparatus shown in FIG. 2.

In the setup section 50, a function, e.g., the one shown in FIG. 7 is set in advance. The compression ratio $\alpha$ is computed from the dynamic range (DR) of the image signal by using this function. In this function, the compression ratio $\alpha$ is zero when the dynamic range is below a threshold value DRth. That is, with respect to an image having a narrow dynamic range, dynamic range compression processing is not performed. This is because if the signal of an image having a narrow dynamic range is compressed, the contrast of the image becomes so low that an adverse effect of reducing the image quality results.

Also, a study made by the inventors of the present invention shows that setting the density of a lightest spot-like portion in a photographed image, e.g., an image of a lightning lamp below the lowest density on a print is more advantageous in terms of image quality than imaging the lightest spot-like portion with gradation by dynamic range compression processing. Therefore, the setting of the function shown in FIG. 7 is such that when the dynamic range extends a threshold value DRmax, the compression ratio $\alpha$ is not reduced below a lower limit value a max.

A total compression function $f(\alpha)$ is set by using this compression ratio $\alpha$.

Figure 8A:
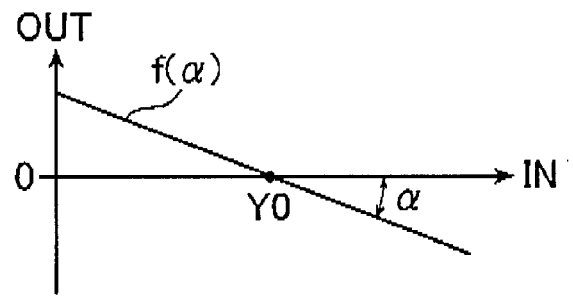
FIGS. 8A through 8E are diagrams respectively showing examples of compression functions used in the image processing apparatus shown in FIG. 2.

As shown in FIG. 8A, this compression function $f(\alpha)$ is a monotone decreasing function having a point of intersection with the x-axis (output 0), the point representing a certain signal value as a reference value $Y_0$, and having an inclination corresponding to the compression ratio $\alpha$. This reference value $Y_0$ is a reference density and may be appropriately set according to the density of a center of an image corresponding to a main subject, for example. For example, if a human figure is set as a main subject, the reference density may be set to a value in the range of print density values of 0.5 to 0.7, preferably about 0.6, i.e., a value generally equal to the density of human flesh color.

Further, the setup section 50 sets a (dynamic range) compression ratio $\alpha_{light}$ with respect to a light portion and a (dynamic range) compression ratio $\alpha_{dark}$ with respect to a dark portion, and forms a light portion compression function $f_{light}(\alpha_{light})$ and a dark portion compression function $f_{dark}(\alpha_{dark})$.

Figure 8B:
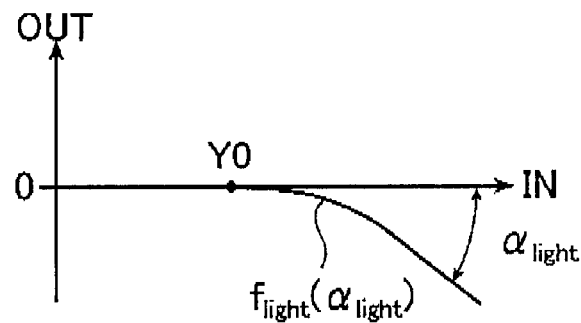

As shown in FIG. 8B, the light portion compression function $f_{light}(\alpha_{light})$ is a decreasing function below the x-axis (output 0) (on the negative side) on the light portion side of the reference value $Y_0$. The inclination of a straight portion of the line of this function represents the light portion compression ratio $\alpha_{light}$. The output on the dark portion side of the reference value $Y_0$ is 0. This compression ratio $\alpha_{light}$ is set according to a density histogram and an image feature values of a highlight or the like so that the light portion image signal is an image signal within an image reproduction range in a print.

On the other hand, as shown in FIG. 5C, the dark portion compression function $f_{dark}(\alpha_{dark})$ is a decreasing function above the x-axis on a darker portion side of the reference value $Y_0$. The inclination of a straight portion of the line is a function representing the dark portion compression ratio $\alpha_{dark}$. The output on the lighter portion side of the reference value $Y_0$ is 0. This compression ratio $\alpha_{dark}$ is also set according to a density histogram and an image feature values of a shadow or the like so that the dark portion image signal is an image signal within an image reproduction range in a print.

According to the present invention, the light portion compression ratio $\alpha_{light}$ and the dark portion compression ratio $\alpha_{dark}$ are set not only from a prescan image signal but also from information including photography information obtained by the condition setting section 44 (setup section 50), as described above.

For example, in a case where information that an image was photographed by using flashlight and by setting a high lens power (higher than a predetermined value) is obtained as photography information, it is possible to determine that the image is the result of short-distance photographed scene with flashlight. In this case, an image closer to a viewer's impression of the actual scene photographed can be obtained by the process of performing brightness correction by increasing the density and thereafter largely compressing the dark portion. Accordingly, the dark portion compression ratio $\alpha_{dark}$ is increased relative to the ordinary setting.

In a case where information that an image was photographed without using flashlight is obtained as photography information, and where the image signal has a high brightness with respect to a highlight portion and a histogram of the image signal has main two peaks, it is possible to determine that the image is the result of photography of a backlighted scene. The peak on the light side corresponds to the background while the peak on the dark side corresponds to a main subject (e.g., a human figure). In this case, the process of performing brightness correction by reducing the density and thereafter largely compressing the light portion is preferred. Accordingly, the light portion compression ratio $\alpha_{light}$ is increased relative to the ordinary setting.

In the APS system, a photographed scene (scene ID) can be magnetically recorded on the film F.

In a case where a photographed scene (scene ID), for example, "night scene portrait" is obtained as photography information recorded by utilizing this function of the APS system, brightness correction is performed by increasing the density and the dark portion compression ratio $\alpha_{dark}$ is increased relative to the ordinary setting. In contrast, in a case where "snow" is obtained as photography information in the same manner, the light portion compression ratio $\alpha_{light}$ is increased relative to the ordinary setting.

Setting of the light portion compression ratio $\alpha_{light}$ and the dark portion compression ratio $\alpha_{dark}$ according to photography information is not limited to particular methods. For example, a method may be used in which correction coefficients for correcting the compression ratio $\alpha_{light}$ and the compression ratio $\alpha_{dark}$ with respect to scenes identifiable from photography information are set in advance by experiments or simulations, the correction coefficients corresponding to one of the scenes identified are read out, and the compression ratio $\alpha_{light}$ and the compression ratio $\alpha_{dark}$ computed from a prescan image signal are corrected by using the correction coefficients.

There may be many cases of short-distance photography with flashlight, photographed scenes "snow", and the like where using a compression table specially prepared according to particular photographic conditions is preferable to forming a compression table by correcting compression ratios. With respect to such cases, special compression tables related to scenes may be prepared and stored by experiments or simulations to be used by being read out according to the identified scenes.

Photography information to be referred comprises, for example, a photographed scene (scene ID), use/non-use of flashlight at the time of photography, the picture-taking lens power, the main subject position, photographer's intention information, and photographer's preference information. A photographer may input information on on/off of highlight-side compression and shadow-side compression as photographer's intention information when photographing a scene by supposing photography results while observing the scene through a viewfinder. Alternatively, the photographer may input similar on/off information according to his or her preference.

After the total compression function $f(\alpha)$, the light portion compression function $f_{light}(\alpha_{light})$ and the dark portion compression function $f_{dark}(\alpha_{dark})$ have been computed as described above, these functions are added to form a compression function $f_{total}(\alpha)$ shown below, and the compression table in the second LUT 82 (the second LUT 66) is formed by using this compression function $f_{total}(\alpha)$ $$f_{total}(\alpha)=f(\alpha)+f_{light}(\alpha_{light})+f_{dark}(\alpha_{dark})$$

If compression tables prepared according to scenes as described above have been stored, the compression table corresponding to one of the scenes identified is read out.

The compression table is sent to the parameter integration section 54 and is set in the second LUT 82 (second LUT 66) by the parameter integration section 54.

In the above-described compression table forming method, reference value $Y_0$ is fixed and the compression ratios are independently set with respect to light and dark portions, so that dynamic range compression can be performed by adjusting only the light and dark portions without causing a change in the gradation of an intermediate-density portion. Moreover, the brightness of the entire image can be prevented from being changed by dynamic range compression. Therefore, the above-described brightness correction by the first LUT 74 can be performed independently and the facility with which the image processing conditions are set can be improved.

Figure 8C:
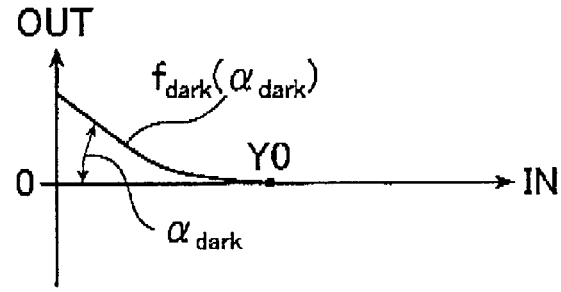
Figure 8D:
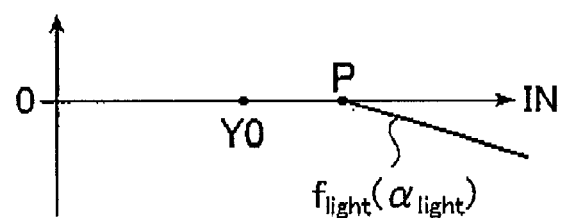
Figure 8E:
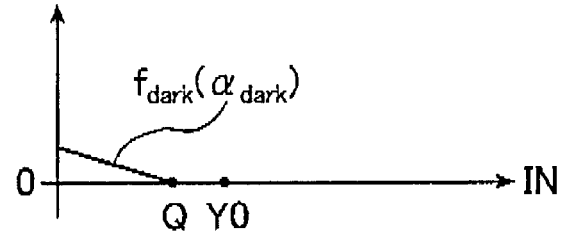

If the compression function $f_{light}(\alpha_{light})$ and the compression function $f_{dark}(\alpha_{dark})$ are formed as functions such as those shown in FIGS. 8D and 8E, archifacts appear due to discontinuities of inclinations at a point 2 and a point Q. Therefore, it is preferable to form the functions so that their differential coefficients change smoothly, as shown in FIGS. 8B and 8C, in order to prevent occurrence of an archifact.

Japanese Patent Application Laid-open No. 3-222577 includes the detailed description with respect to this point.

The total compression ratio $\alpha$, the light portion compression ratio $\alpha_{light}$ and the dark portion compression ratio $\alpha_{dark}$ in the set compression table (compression function) are adjusted by pressing the above-mentioned gradation ($\gamma$) key, the light portion adjustment key ($\alpha_{light}$) and the dark portion adjustment key ($\alpha_{dark}$) in the adjustment keys 56. For example, when the operator presses one of these keys in checking the setting of the compression table, the corresponding correction amount is computed by the key correction section 52, and the compression table set in the second LUT 82 (66) is adjusted by this correction amount.

The second LUT 82 (second LUT 66) thus prepared processes a synthesized unsharp image signal and supplies the processed image signal to the adder 86 (adder 72).

The adder 86 (adder 72) adds together the image signal processed by the first MTX 76 (first MTX 60) and supplied directly to the adder 86 (adder 72) and the processed image signal supplied from the second LUT 82 (second LUT 66), thus performing processing for compressing the dynamic range of the main image signal.

The third LUT 84 (third LUT 68) is a gradation conversion table for converting the image signal obtained by addition performed by the adder 86 (adder 72) into an output image signal.

That is, the third LUT 68 converts, for example, the gradation of a prescan image signal so as to adapt the gradation to the display characteristics of the display 20, and the third LUT 84 converts, also the gradation of a fine scan image signal so as to adapt the gradation to the color development characteristics of a photosensitive material.

The prescan image signal thus processed and output from the third LUT 68 is converted into a signal adapted to the display 20 by the signal converter 70. This signal is further converted from the digital form into an analog form by a digital-to-analog (D/A) converter 88 to be displayed on the display 20.

The image displayed on the display 20 and the corresponding image in a print output from the printer 16 are the results of the same image processing including various kinds of image processing and dynamic range compression processing. Therefore, the same image as that in the print is displayed on the display 20.

The operator can check the processing results by observing the image on the display 20 and can adjust the image by pressing the adjustment keys 56, as described above.

Inputs produced by the operator operating the adjustment keys 56 are supplied to the key correction section 52 to be set as correction amounts for correcting image processing conditions. The correction amounts and the image processing conditions set by the setup section 50 are combined in the parameter integration section 54 to set new image processing conditions after the correction by the inputs from the keys, or the image processing conditions set in the two image processing sections (46, 48) are adjusted by the correction amounts. That is, the tables in the first LUT 74 (first LUT 58), the parameters in the unsharp image computation section 80 (unsharp image computation section 64), the compression table in the second LUT 82 (second LUT 66), and the conversion table in the third LUT 84 (third LUT 68) are adjusted by inputs provided through the operation of the adjustment keys 56. The image displayed on the display 20 are also changed according to the adjustments.

On the other hand, the fine scan image signal output as an image signal adapted to image recording in a print after being processed by the third LUT 84 of the fine scan image processing section 48 is sent as an output image signal to the printer 16.

The number of filters LPF $80a_1$ to $80a_n$ in the unsharp image computation section 80 (unsharp image computation section 64) of the fine scan image processing section 48 (displayed image processing section 46) can be changed by setting through the key correction section 52, as described above. However, one low-pass filter is normally set in advance and dynamic range compression processing is performed on the basis of an unsharp image signal generated by the one low-pass filter. Two or more low-pass filters are set according to the necessity, one synthesized unsharp image signal is generated from a plurality of unsharp image signals prepared by a plurality of filtering processes, and dynamic range compression processing is performed on the basis of this synthesized unsharp image signal, as described above.

"Two or more low-pass filters are set according to the necessity" in the above refers to, for example, a case where the filter setting is changed from one low-pass filter to a plurality of low-pass filters on the basis of a scene identification result such as a high contrast scene, a wide dynamic range scene, etc., and where a plurality of filters are set when the degree of dynamic range compression becomes high from the condition in which one filter is set since the degree of dynamic range compression is low, that is, the number of filters is changed according to the degree of dynamic range compression.

Further, a change for setting a plurality of low-pass filters to be operated for filtering may be made by an instruction from the operator observing and checking an image displayed on the display 20, by an instruction determined by the operator from an image in a print output from the printer 16, or by an instruction to reduce a pseudo edge band when an instruction key or the like for reducing a pseudo edge band generated as a secondary effect about a photographed subject by dynamic range compression processing as described above is pressed.

Further, in a case where images are processed under certain conditions with respect to required image quality and the amount of images to be processed, for example, a case where there is a need to process a multiplicity of images in a short time while the required image quality is not so high, one low-pass filter may be used to perform dynamic range compression processing at a higher processing speed. On the other hand, in a case where there is a need to perform processing in such a mode as to maximize the image quality, the filtering mode may be changed to use a plurality of filters and to perform dynamic range compression processing such that the original image can be faithfully reproduced without causing a pseudo edge band visibly, although the processing speed is reduced in comparison with the filtering processing using only one low-pass filter. Such a filtering mode change may be made automatically or manually changed according to the required image quality and the amount of images to be processed.

The arrangement may be such that an instruction is provided to make such a change with respect to each of image frames to be processed and to each of strips of film read by the scanner 12, or to each of batches of images to be processed.

The processor 14 is arranged as described above.

The operation of the processor 14 will be described for explanation of details of the image processing method of the present invention.

When a prescan image signal is stored in the prescan memory 40, the setup section 50 in the condition setting section 44 reads out this signal, forms a density histogram, computes the image feature value such as a highlight level and a shadow level, and sets and records fine scan reading conditions by determining the aperture of the variable diaphragm 24, etc.

The condition setting section 44 of the processor 14 is provided with information (instructions) input by an operator operating the keys, and magnetic information read from film F by the carrier 30. The condition setting section 44 obtains photography information from the magnetic information.

On the other hand, the setup section 50 in the condition setting section 44 forms a gray balancing table, a brightness correction table and a gradation correction table for the first LUTs 74 and 58, filter coefficients β, synthesis ratio coefficient t, and an unsharp image synthesis table for the unsharp image computation sections 80 and 64, a compression table for the second LUTs 82 and 66, and a grayscale conversion table for the third LUTs 84 and 88 by using the formed density histogram, the computed image feature values, etc. That is, the setup section 50 sets image processing conditions and outputs the image processing conditions to the parameter integration section 54. The unsharp image synthesis table for the unsharp image computation section 80 and 64 and the compression table for the second LUTs 82 and 66 are set on the basis of not only the prescan image signal but also referring to the obtained photography information. The parameter integration section 54 transfers the supplied image processing conditions to the corresponding sections of the displayed image processing section 46 and the fine scan image processing section 48, thereby setting the image processing conditions in these sections.

When the image processing conditions are set, the first LUT 58 in the displayed image processing section 46 reads out the prescan image signal from the prescan memory 40, and processes the read image in accordance with the set tables, and the first MTX 60 then performs color correction on the image signal. The image signal processed by the first MTX 60 is supplied to the adder 72 and to the second MTX 62.

The second MTX 62 forms brightness image signal of the read image from the supplied image signal. From this brightness image signal, the unsharp image computation section 64 generates a synthesized unsharp image signal from a plurality of unsharp image signals generated by filtering processes. This synthesized unsharp image signal is processed by the compression table in the second LUT 66 and is supplied to the adder 72.

The adder 72 adds together the image signal processed by the first MTX 60 and the processed image signal processed by the second LUT 66 to compress the dynamic range of the image signal, thereby generating an image signal for display on the display 20.

The image signal output from the adder 72 is processed in the third LUT 68 to be converted into an image signal to be suitably displayed on the display 20, is converted into a signal suitable for display on the display 20 by the signal converter 70, and is converted into an analog signal by the D/A converter 88 to be displayed on the display 20.

The operator observes and checks the image displayed on the display 20 and makes various adjustments by using the adjustment keys 56 if necessary. If some inputs are given by operating the adjustment keys 56, the image processing conditions set by key inputting and the image processing conditions set by the setup section 50 are combined to form reset or changed image processing conditions. Also, if some inputs are given by operating the adjustment keys 56, correction amounts are computed and the parameter integration section 54 combines the correction amounts and the image processing conditions set by the setup section 50 to obtain reset or changed image processing conditions. The tables set in the LUTs of the displayed image processing section 46 and the fine scan image processing section 48 are correspondingly changed and the image on the display 20 is changed.

In this checking, the operator may identify a scene from the image and input corresponding information by using the function key or the like in the keyboard 18*a* to adjust the filter coefficient β, the synthesis ratio coefficient t, etc., in the unsharp image computation section 64, and the compression table in the second LUTs 82 and 66, as described above.

The operator inputs an instruction to output the image (e.g., start printing) when determining that the image is correct (check results OK).

The image processing conditions are thereby determined and a fine scan is then started. When the fine scan is started, the fine scan reading conditions recorded and held at the time of prescanning are read out and the scanner 12 is adjusted and then operated to perform the fine scan. A fine scan image signal is sequentially transferred to and stored in the fine scan memory 40. Thereafter, the first LUT 74 in the image processing section 48 reads out the fine scan image signal from the fine scan memory 42.

Subsequently, the fine scan image signal undergoes gray balancing, brightness correction and gradation correction based on the tables set in the first LUT 74, then undergoes color correction in the first MTX 76 and is supplied to the adder 86 and to the second MTX 78, similarly to the above-described prescan image signal.

The second MTX 78 forms a brightness image signal from the supplied image signal. The unsharp image computation section 80 generates a plurality of unsharp image signals from this brightness image signal, and generates a synthesized unsharp image from the plurality of unsharp image signals. This synthesized unsharp image signal is processed by the compression table in the second LUT 82 and is supplied to the adder 86.

The adder 86 adds together the image signal processed by the first MTX 76 and the processed image signal processed by the compression table in the second LUT 82 to compress the dynamic range of the image signal. The image signal then undergoes gradation conversion in the third LUT 84 to be converted into an output image signal having such characteristics as to suitably record an image in the printer 16.

Figure 9A:
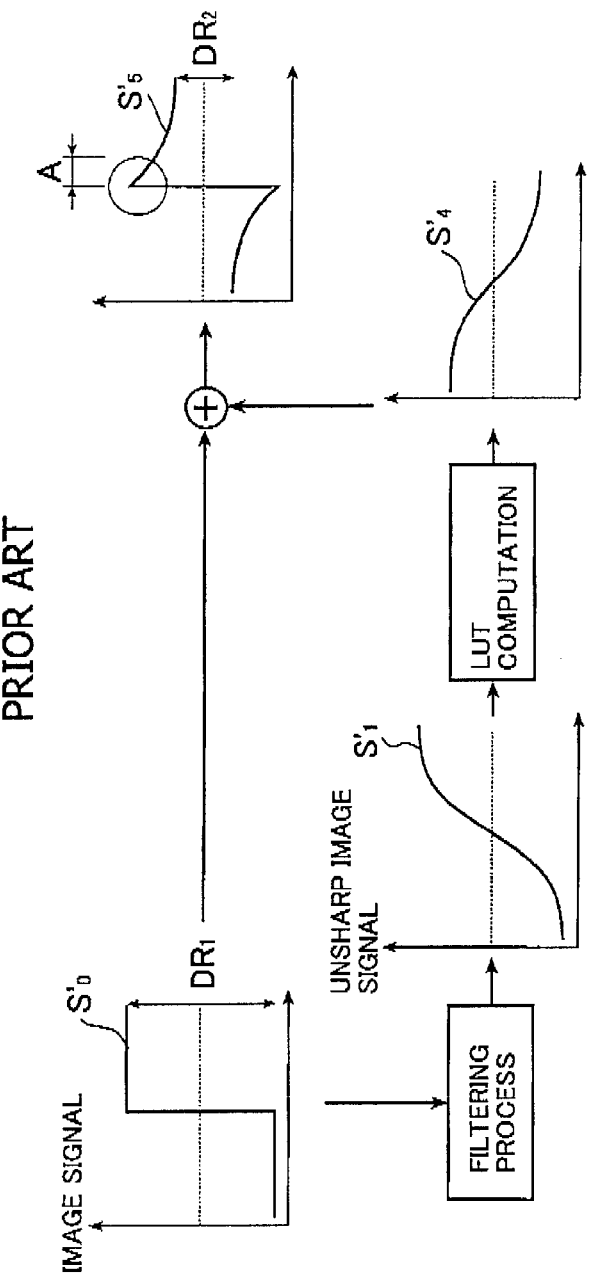
FIG. 9A is a diagram schematically showing a conventional dynamic range compression process.

In the conventional dynamic range compression processing, as shown in FIG. 9A, one unsharp image signal $S_1'$ is generated from an image signal $S_0'$ representing an original image by filtering processing with a low-pass filter, a processed image signal $S_4'$ for dynamic range compression is generated from the unsharp image signal $S_1'$ by LUT computation, and the processed image signal $S_4'$ is added to the image signal $S_0'$ of the original image, thereby obtaining a dynamic range-compressed image signal $S_5'$.

Figure 9B:
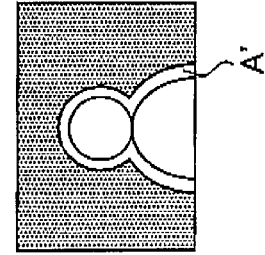
FIG. 9B is a diagram showing an image obtained by the conventional dynamic range compression process.

In the conventional processing, while the dynamic range of the image signal $S_0'$ is compressed from $DR_1$ to $DR_2$ as shown in FIG. 9A, the image signal has a large overshooting portion in a region A corresponding to the vicinity of an edge portion of the image at which the image signal changes abruptly. Overshooting in the region A is a cause of the above-described pseudo edge band generated in the conventional image processing to appear as a light band A' outside the boundary between a background and a subject, as shown in FIG. 9B.

Figure 10:
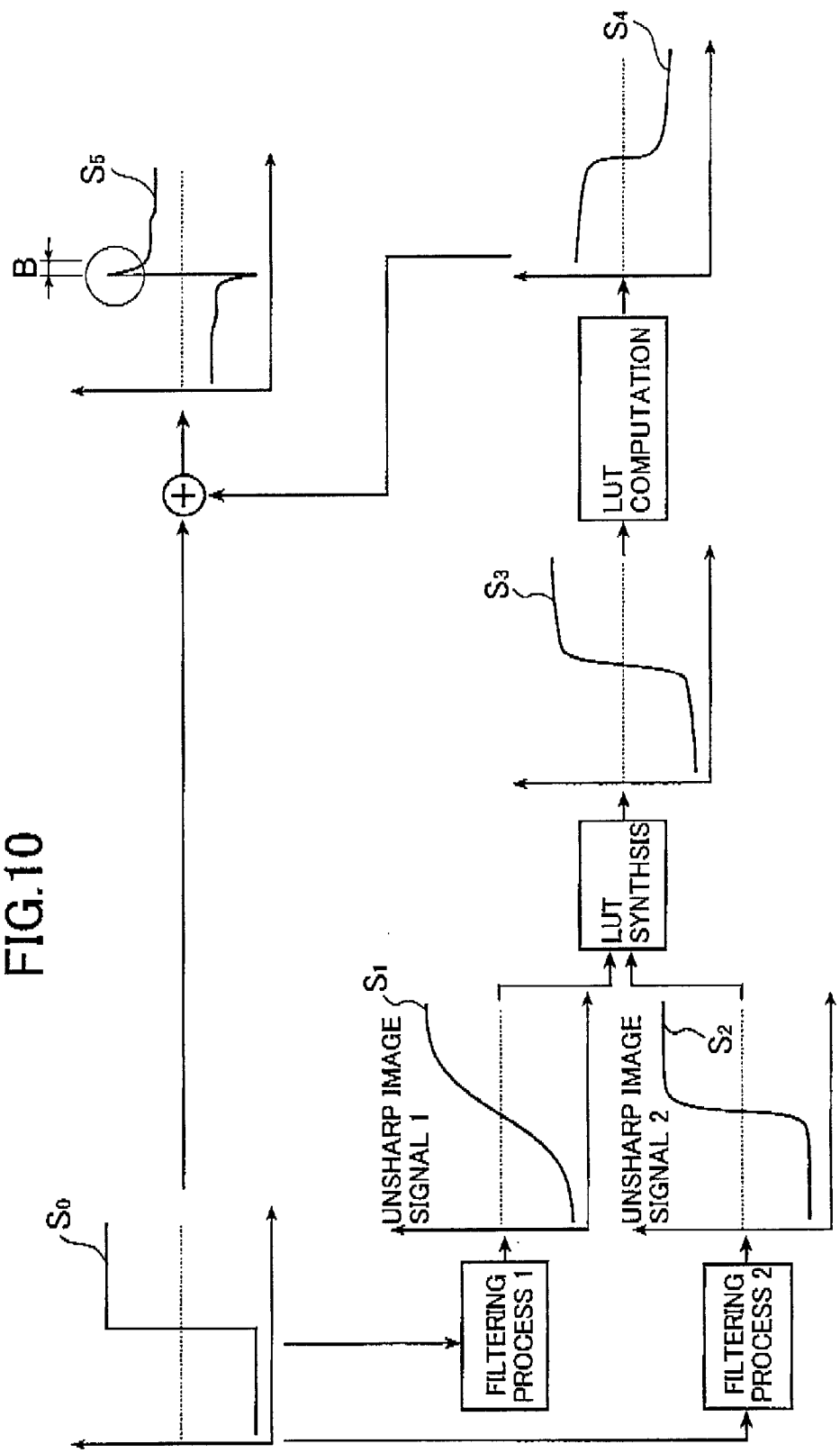
FIG. 10 is a diagram schematically showing a dynamic range compression process in accordance with the image processing method of the present invention.

According to the present invention, as shown in FIG. 10, an unsharp image signal $S_1$ of an unsharp image 1 and an unsharp image signal $S_2$ of an unsharp image 2 are generated by filtering processing using a plurality of low-pass filters, e.g., two low-pass filters, such as LPFs $80a_1$ to $80a_n$ in the unsharp image computation section 80 and LPFs $64a_1$ to $60a_n$ in the unsharp image computation section 64. From the unsharp image signal $S_1$ and the unsharp image signal $S_2$, a synthesized unsharp image signal $S_3$ having a lower degree of unsharpness with respect to a region mainly containing a high-contrast edge portion of a subject, and a higher degree of unsharpness with respect to a flat region having comparatively low contrast is synthesized by the LUT computation section 80b or the LUT computation section 64b (by LUT synthesis), LUT computation is performed on the synthesized unsharp image signal $S_3$ to generate a processed image signal $S_4$ for dynamic range compression. This processed image signal $S_4$ is added to the image signal $S_0$ of the original image to obtain an image signal $S_5$. In this processing, dynamic range compression is performed on the basis of a synthesized unsharp image signal generated from a plurality of unsharp image signals. Therefore, in a region containing an edge portion of the subject causing a high-contrast abrupt image density change, the overshooting width B shown in FIG. 10 is reduced in comparison with the overshooting width in the result of the conventional processing, so that occurrence of light band A', such as shown in FIG. 9B, at the boundary between the subject and the background can be reduced or prevented. With respect to a flat region having comparatively low contrast and having comparatively small density variation, the synthesized unsharp image signal is mainly generated by an unsharp image signal having a higher degree of unsharpness. Therefore, when the image signal $S_4$ is added to the image signal $S_0$ of the original image, the image signal in the comparatively flat region can be generally maintained, thereby preventing generation of a low-contrast indistinct region.

The check of the output image by the operator as described above is not always required. The printing process may be performed without the check by the operator.

In such a case, the setup section 50 sets image processing conditions, and the image processing conditions are determined when the parameter integration section 54 sets the conditions in the respective sections. Then the first LUT 74 starts reading the fine scan image signal and performing image processing.

The process of setting a plurality of low-pass filters and performing dynamic range compression processing on the basis of a synthesized unsharp image signal synthesized from unsharp image signals obtained by the desired filtering processing as described above may be started when necessary by a mode change from a normal mode in which one low-pass filter is set in advance and dynamic range compression processing is performed on the basis of an unsharp image signal generated with the one low-pass filter. "Started when necessary by a mode change" refers to, for example, being started by a mode change according to the result of scene identification, according to the ratio of dynamic range compression, by an instruction from an operator, or according to the image quality level required of the processed image, the number of images to be processed, etc.

As mentioned above, the image signal processed by the image processor 14 is sent to the printer 16.

The printer 16 performs exposure of a photosensitive material (photographic paper) according to an image signal to record a latent image thereon, and performs a development process according to the photosensitive material to output a (finished) print. For example, the printer 16 cuts the photosensitive material into pieces of a predetermined length according to output prints, performs back print recording, and performs latent image recording or the like by modulating with an image signal (recording image) three beams of R exposure light, G exposure light and B exposure light according to the spectral sensitivity characteristics of the photosensitive material (photographic paper), by deflecting each beam in a main scanning direction, and by transferring each photosensitive material in an auxiliary scanning direction perpendicular to the main scanning direction. Thereafter, the printer 16 performs, on the photosensitive material having a latent image recorded thereon, a predetermined wet development process including color development, bleaching fixation and rinsing, and dries the photosensitive material obtained as a print. The printer 16 obtains a number of prints in the above-described manner and sorts and stacks the prints.

The present invention has been described in detail with respect to the image processing method and apparatus of the present invention. Needless to say, the present invention is not limited to the above-described embodiment and various modifications and changes of the described method and apparatus may be made without departing from the gist and scope of the invention.

As described above in detail, a plurality of unsharp image signals are prepared, a synthesized unsharp image signal is generated from the plurality of unsharp image signals, and dynamic range compression processing is performed on the basis of the synthesized unsharp image signal. Therefore, even if a high-contrast or wide-dynamic-range image, such as an image photographed in a backlighted condition or by using flashlight, is processed, a comparatively flat portion such as a low-contrast portion in the original image can be reproduced without considerable reduction in contrast or sharpness. Also, appearance of a pseudo edge band caused when dynamic range compression processing is performed at a high compression ratio can be reduced. Also, the same effect as that of the conventional dodging can be achieved to enable reproduction of an image of favorable quality.

What is claimed is:

1. An image processing method comprising the steps of:
   generating a plurality of unsharp image signals representing unsharp images of an original image from an image signal representing the original image;
   generating one synthesized unsharp image signal from the plurality of unsharp image signals; and
   performing dynamic range compression processing on the image signal of the original image on a basis of the synthesized unsharp image signal such as to reduce the dynamic range of the original image.

2. The image processing method according to claim 1, wherein the plurality of unsharp image signals are generated by filtering processes differing from each other in filtering characteristics and have different degrees of unsharpness.

3. The image processing method according to claim 2, wherein the filtering processes are low pass filterings and differ from each other in cutoff frequencies.

4. The image processing method according to claim 3, wherein the plurality of unsharp image signals has a first signal and a second signal, the first signal being generated by a filtering process having a lower cutoff frequency than that of a filtering process for the second signal, and the synthesized unsharp image signal is generated to have a value approaching to a value of the first signal as difference between the first signal and the second signal increases, and to have a value approaching to a value of the second signal as the difference decreases.

5. The image processing method according to claim 2, wherein the filtering processes are performed by filter coefficients differing from each other and the filter coefficients are changed according to a number of pixels in an image reproduced as a reproduction of the original image.

6. The image processing method according to claim 2, wherein the filtering processes are performed by filter coefficients differing from each other and the filter coefficients are changed according to at least one of a result of scene identification of the original image and photography information relating to the original image.

7. The image processing method according to claim 1, wherein the synthesized unsharp image signal is generated using a synthesis ratio or ratios of the plurality of unsharp image signals and the synthesis ratio or ratios are changed according to a number of pixels in an image reproduced as a reproduction of the original image.

8. The image processing method according to claim 1, wherein the synthesized unsharp image signal is generated using a synthesis ratio or ratios of the plurality of unsharp image signals and the synthesis ratio or ratios are changed according to at least one of a result of scene identification of the original image and photography information relating to the original image.

9. The image processing method according to claim 1, wherein the synthesized unsharp image signal is generated by synthesis from the plurality of unsharp image signals based on computation in accordance with at least one of addition, subtraction, multiplication and division of the plurality of unsharp image signals.

10. An image processing apparatus which performs dynamic range compression processing on an image signal representing an original image such as to reduce the dynamic range of the original image, said apparatus comprising:
    a condition setter setting a condition of the dynamic range compression processing which has a number of unsharp image signals to be generated from the image signal of the original image;
    an unsharp image generating device generating a single unsharp image signal or a plurality of unsharp image signals from the image signal of the original image on a basis of the number set in the condition setter;
    a synthesizer synthesizing the plurality of unsharp image signals into a synthesized unsharp image signal when the unsharp image generating device generates the plurality of unsharp image signals; and
    an processor performing the dynamic range compression processing on the image signal of the original image on a basis of the single unsharp image signal or the synthesized unsharp image signal.

11. The image processing apparatus according to claim 10, wherein the unsharp image generating device has a low pass filter or filters to be set which are variable in number and cutoff frequency or frequencies thereof are variable.

12. The image processing apparatus according to claim 11, wherein the low pass filters includes a first filter for a first signal of the unsharp image signals and a second filter for a second signal of the unsharp image signals, the first filter having lower cutoff frequency than the second filter, and the synthesizer generates a synthesized unsharp image signal to have a value approaching to a value of the first signal as difference between the first signal and the second signal increases and to have a value approaching to a value of the second signal as the difference decreases.

13. The image processing apparatus according to claim 11, wherein the cutoff frequency or frequencies are changed according to a number of pixels in an image reproduced as a reproduction of the original image.

14. The image processing apparatus according to claim 11, wherein at least one of the number of low pass filters and the cutoff frequency or frequencies are changed according to at least one of a result of scene identification of the original image and photography information relating to the original image.

15. The image processing apparatus according to claim 10, wherein the synthesizer generates the synthesized unsharp image signal using synthesis ratio or ratios which are changed according to a number of pixels in an image reproduced as a reproduction of the original image.

16. The image processing apparatus according to claim 10, wherein the synthesizer generates the synthesized unsharp image signal using synthesis ratio or ratios which are changed according to at least one of a result of scene identification of the original image and photographing information relating to the original image.

* * * * *